June 6, 1961 — F. K. CLARKE ET AL — 2,986,846
TUBULATION TIP-OFF APPARATUS
Filed Nov. 18, 1957 — 3 Sheets-Sheet 1
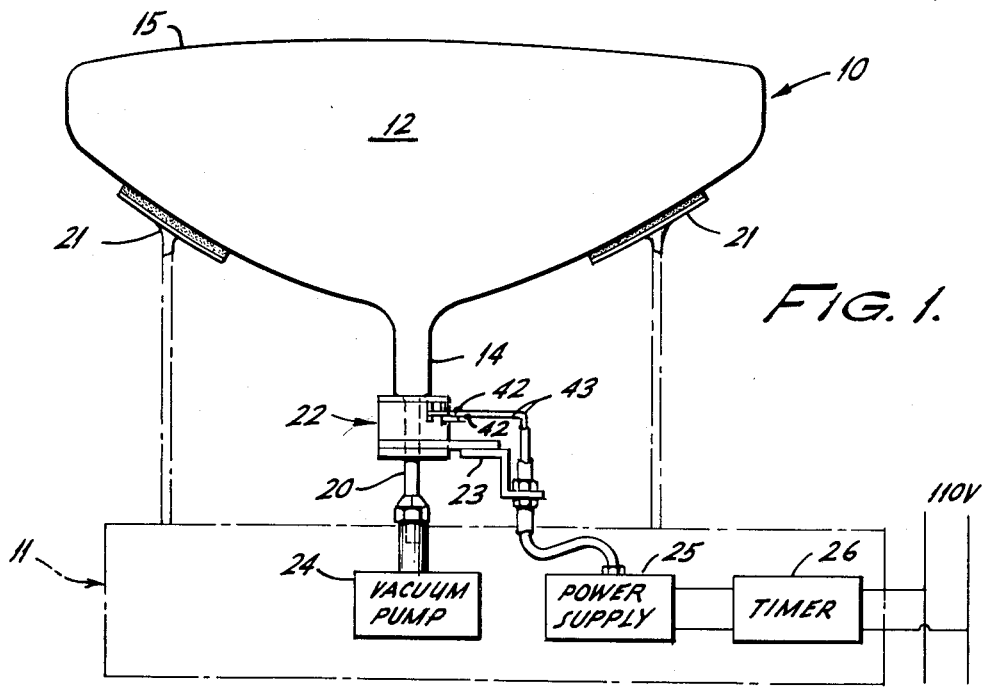
FIG. 1.
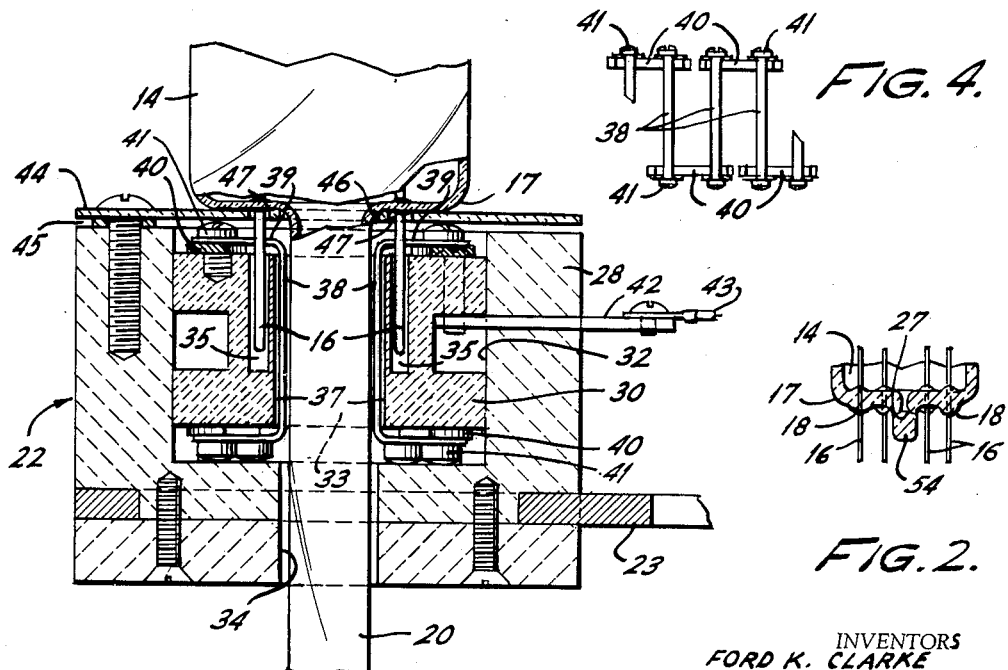
FIG. 4.
FIG. 2.
FIG. 3.
INVENTORS
FORD K. CLARKE
RICHARD A. MAINES
BY JOHN W. SNYDER
ATTORNEY

INVENTORS
FORD K. CLARKE
RICHARD A. MAINES
BY JOHN W. SNYDER

ATTORNEY

June 6, 1961   F. K. CLARKE ET AL   2,986,846
TUBULATION TIP-OFF APPARATUS
Filed Nov. 18, 1957   3 Sheets-Sheet 3

INVENTORS
FORD K. CLARKE
RICHARD A. MAINES
BY JOHN W. SNYDER

ATTORNEY

United States Patent Office 2,986,846
Patented June 6, 1961

2,986,846
TUBULATION TIP-OFF APPARATUS
Ford K. Clarke, Chalfont, Richard A. Maines, Souderton, and John William Snyder, Hatfield, Pa., assignors to Philco Corporation, Philadelphia, Pa., a corporation of Pennsylvania
Filed Nov. 18, 1957, Ser. No. 697,147
3 Claims. (Cl. 49—57)

The present invention relates to processing of electronic tubes and more particularly to apparatus for effecting the final sealing of cathode ray tube envelopes.

Recent developments in the construction of cathode ray tube structures account for the production of considerably shorter cathode ray tubes, that is to say tubes which have greatly reduced front-to-back dimensions. The provision of short cathode ray tubes is important in view of the demand for slimmer and more compact television receivers, and it is a general object of the present invention to provide a cathode ray tube the overall depth or full front-to-back expanse of which is of a size shorter than has heretofore been possible of attainment.

Cathode ray tubes of the type with which the invention is concerned, usually have stiff wire leads or pins extending longitudinally from the base of the tubular neck portion of the tube envelope and arranged in a circular pattern about and adjacent to an elongated exhaust tubulation formed as an extension of the neck portion of the tube. This arrangement of stiff leads and exhaust tubulation gives rise to problems in "tipping-off" the tubulation to effect final sealing of the tube envelope following evacuation thereof, which problems become particularly difficult when attempts are made to provide the cathode ray tube with a short tip-off. It is therefore another and more specific object of this invention to overcome these problems and difficulties by utilizing new and improved means capable of tipping-off the tubulation at a point in close proximity to the terminating ends of the stiff leads so as to provide a tip-off which does not project materially beyond said leads.

Heretofore the length of the tip-off portion has generally been governed by the length of the stiff leads and, in those instances when longer leads are desirable, the length of the tip-off brings about a dangerous condition because the longer tip-off results in leaving an elongated hollow tubular portion at the base of the envelope neck, which portion is subject to accidental breakage. A characteristic feature of this invention resides in the fact that the provision of a short tip-off, that is to say a tip-off which is close to the base of the neck portion of the tube envelope, is possible regardless of the length of the pins. In other words in accordance with one aspect of the invention, the tip-off of the exhaust tubulation can be made at a short distance from the base of the neck regardless of the length of the pins.

In attaining the above noted and other objects and features, the invention provides a heater device commonly called a "tip-off oven" which incorporates novel structural features whereby heat can be applied to an exhaust tubulation of a tube envelope at a place close to the outer surface of the base or end of the neck portion and located intermediate said surface and the terminating ends of the longitudinally extending stiff leads. In this manner there is provided a sealing tip-off portion which terminates in a plane lying closely adjacent to or coinciding with the plane in which said leads terminate. To that end, the tip-off oven of the invention includes means for receiving the elongated tubulation of the cathode ray tube envelope and for generating and applying heat within a concentrated area of the tubulation portion which is confined within the space defined by the circular row of stiff leads.

In accordance with the invention, the tip-off oven also includes means for accommodating as well as protecting said pins and their sealing connection to the glass base of the tube envelope, against detrimental effects of the heat of said oven.

The subject matter which we regard as our invention is particularly pointed out and distinctly claimed in the portion which concludes this specification. However our invention, its organization and method of operation will be best understood by reference to the following description taken in conjunction with the accompanying drawings in which:

FIGURE 1 is a schematic illustration of a system for evacuating electronic tubes, the system being provided with a tip-off oven constructed in accordance with the present invention to effect sealing and tip-off of the exhaust tubulation of the tube envelopes;

FIGURE 2 is an enlarged sectional view of the base portion of a cathode ray tube with a tip-off obtained in accordance with the invention;

FIGURE 3 is a vertical sectional view on a larger scale, taken centrally through a preferred form of tip-off oven used in a system as shown in FIGURE 1;

FIGURE 4 is a digrammatic view illustrating the development of the resistive wire arrangement;

Figure 5:
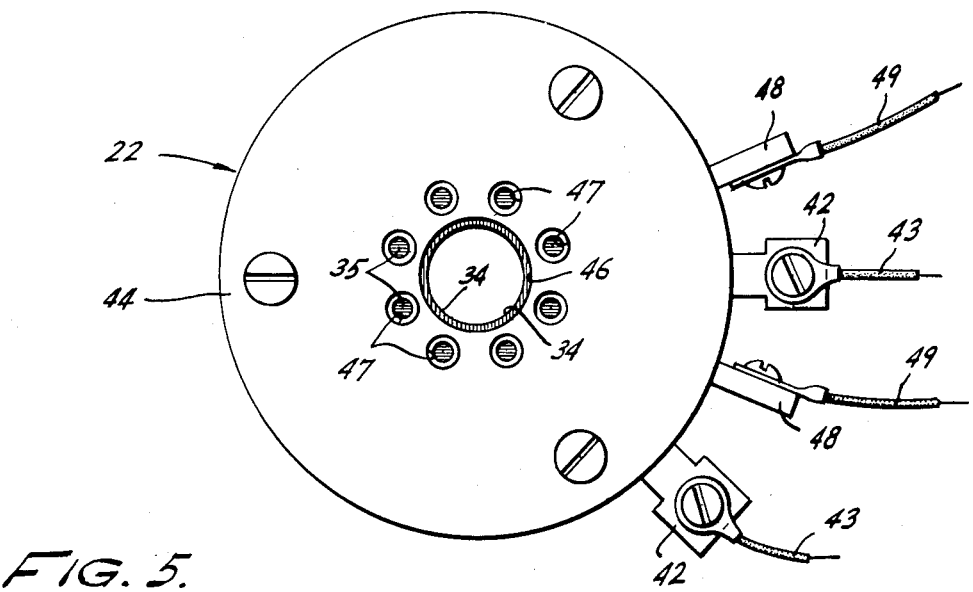
FIGURE 5 is a top plan view of the oven illustrated in FIGURE 3.

Although the invention may be employed in processing various types of electronic tubes, the principles of the invention are particularly applicable to the manufacture of cathode ray tubes of the type hereinbefore mentioned. Accordingly the specific embodiments herein given by way of examples, are illustrated in the drawings and will be described hereinafter in connection with such a tube.

Having more particular reference to the drawings, there is shown in FIGURE 1 a cathode ray tube, generally designated at 10, which is supported on an evacuating and tubulation tipping-off machine diagrammatically represented at 11. As shown the cathode ray tube comprises a glass tube envelope having an enlarged bulbous portion 12 and a tubular neck portion 14. The bulbous portion is provided with a face plate 15, the internal surface of which is treated in the customary fashion to form a luminous screen. The neck portion 14 of the tube is adapted to accommodate the usual electron gun structure (not shown) which is electrically connected with stiff leads or conact pins 16. These leads or pins, as best seen in FIGURE 2, depend from the base 17 of the neck portion 14 and are affixed thereto by means of customary glass-to-metal seal connections 18. The stiff leads or contact pins 16 are arranged in a circular pattern about an elongated glass tubulation 20 which forms a continuous extension of the neck portion 14 and serves in exhausting the tube.

The procedure commonly followed in processing a tube of the above described variety includes the steps of evacuating the tube envelope and activating the cathode of the gun structure, and thereafter sealing the tube by tipping-off the exhaust tubulation. For these purposes the tube envelope is engaged on supports 21 provided on the exhausting and tipping-off machine, so that the tubulation 20 passes through a tipping-off oven 22 carried on the machine by adjustable bracket means 23. The lower open end of the tubulation communicates with a vacuum pump 24 for evacuating the tube envelope. Following evacuation, the tip-off oven is energized through a power supply 25 controlled by means of a timer 26.

Figure 6:
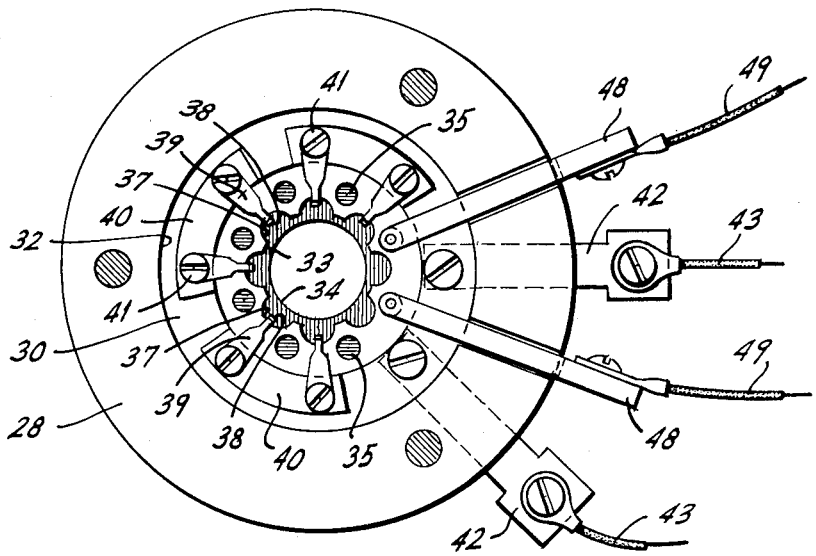
FIGURE 6 is a view similar to FIGURE 5 with the heat reflecting plate removed.

In particular accordance with the invention the tip-off oven is adapted to encircle that portion of the exhaust tubulation 20 which is disposed adjacent the outer surface of the base 17 so that a seal 27 (FIGURE 2) occurs at a place close to said surface. For that purpose the invention provides a novel and unique tip-off oven which, as more clearly shown in FIGURES 3 and 6, comprises an outer shell 28 and an inner core 30. In the illustrated embodiment the outer shell is made of refractory insulating material of a type capable of acting as a heat barrier such as pressed asbestos base material. The shell is formed with an internal chamber 32 into which the core 30 snugly fits. The core is a cylindrical body made of refractory material capable of withstanding high heat, such as a high grade ceramic or similar substance, and is provided with centrally disposed tubulation-receiving opening or bore 33 which is aligned with an aperture 34 in the bottom wall of the shell. The core is also provided with a plurality of pin-receiving apertures 35 shaped and disposed to receive the stiff leads or contact pins 16 of the cathode ray tube. As more clearly seen in FIGURE 6 the pin-receiving apertures 35 are arranged in a circular pattern and spaced from each other, and channels or concaved areas 37 in which are located flattened electrically resistive portions or elements 38, bound the tubulation-receiving opening 33 at regions interposed between adjacent spaced pin-receiving apertures. The opposite ends of each of the elements 38 are formed with a fanned-out portion 39 which are bent over the marginal end surfaces of the core for contact with connecting members 40 by means of securing elements 41 which also serve to anchor said members to the core. It will be noted, as represented in FIGURE 4, that alternate connecting members are arranged on opposite marginal portions of the core so that the several resistive elements are connected in series. In practice the series-connected resistive elements are provided with a pair of terminals 42 for connection to the power supply through conductors 43 as represented in FIGURE 1.

In order to protect the base of the neck portion 14 of the tube and also the glass seal between said base and the stiff leads or pins, the oven is provided with a heat reflective porcelainized plate 44 mounted over the top surface of the oven and spaced therefrom to provide an air space 45. This plate is provided with a central opening 46 and a circular pattern of perforations 47, said opening registering with the bore 33 of the core, and said perforations registering with the apertures 35 so as to accommodate the pins of the tube for engagement in the protective core.

Connectors 48 and conductors 49 are also provided to effect electrical connections with the filament leads of the tube to activate the cathode of the gun in the customary manner.

Figure 7:
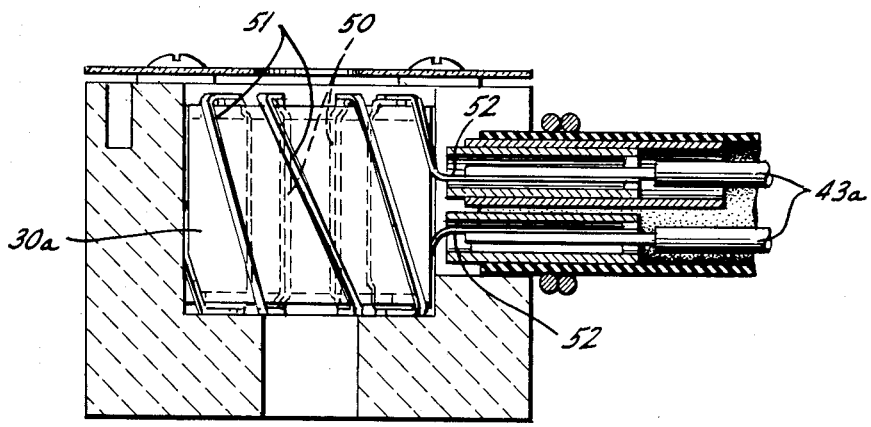
FIGURE 7 is a vertical sectional view taken centrally through a modified form of the tip-off oven.
Figure 8:
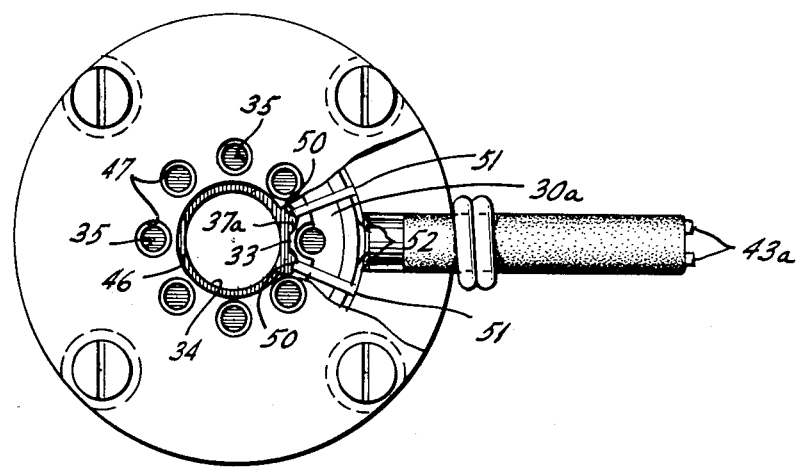
FIGURE 8 is a top plan view of the oven illustrated in FIGURE 7.

In FIGURES 7 and 8 there is illustrated a modified form of the tip-off oven. The main difference between this form of oven and the form hereinbefore described, resides in the arrangement of the resistive elements of the heater. In the latter form the heater is provided by association of the ribbon-like members 50 and 51. The members 50 are disposed internally of the core 30a and fit within the scalloped portions 37a thereof, whereas the elements 51 are disposed on the outer circumferential surface of the core and serve to link adjacent internal elements as clearly seen in FIGURE 7. Portions 52 of certain of these elements are adapted for connection with conductors 43a for coupling to the power supply of the evacuating and tipping-off machine.

In using the oven either in the form illustrated in FIGURES 3 to 6, or in FIGURES 7 and 8, the cathode ray tube is supported so that the stiff leads or pins 16 thereof become snugly seated within the recesses or apertures 35, the tubulation 20 of the tube envelope passing through the central aligned aperture 46, bore 33 and hole 34 of the oven assembly. In this manner the heat generated by the resistive elements of the oven is applied to the portion of the tubulation which is disposed within the space defined by the circular pattern of pins 16 and located adjacent the exposed surface of the base of the neck portion 14, so as to effect the seal 27 (see FIGURE 2) and a tip-off portion 54 in the vicinity of the region where the pins terminate. In effecting such a seal and tip-off, the pins and their connection to the base of the neck are protected against detrimental effects of the heat required in the sealing and tipping-off operations by the fact that the pins are actually embedded within the bores or recesses 35 of the refractory core 31, and by the fact that the glass-to-metal connections between said pins and base are effectively isolated from the oven by means of the porcelainized reflecting plate.

From the foregoing description it will be appreciated that the invention makes it possible to provide an exceedingly short tip-off portion for electronic tubes regardless of the length of the contact leads or pins thereof. As a result the overall front-to-back dimensions of the completed electronic tube can be reduced to a minimum.

Although the invention has been shown and described with reference to specific embodiments, it will be understood that these embodiments are susceptible to structural variations without departing from the gist of the invention. Accordingly it is to be understood that the invention contemplates any changes or modifications which may come within the scope of the appended claims.

We claim:

1. Apparatus for tipping-off the exhaust tubulation of an electronic tube envelope provided with contact pins disposed about and adjacent to said tubulation and extending in parallelism therewith, said apparatus comprising a cylindrical body defining a tubulation-receiving opening and having pin-receiving tubular apertures spaced from each other, said apertures being arranged adjacent to and extending in parallelism with the longitudinal wall of said tubulation-receiving opening, said wall being recessed between adjacent pin-receiving apertures to define channels bounding said opening at regions interposed between said apertures, electrical resistance heating means having portions occupying said channels, an outer insulating shell having an internal chamber housing said body, a heat reflective plate mounted upon said shell to support the electronic tube envelope at its base, said plate having an opening and apertures disposed in registration with the mentioned opening and apertures of said body, and spacer means between said plate and shell to define an air space cooperating with said plate to provide a heat barrier between the mentioned heating means and the base of the electronic tube envelope.

2. Apparatus as set forth in claim 1, in which the mentioned portions of the mentioned heating means are in the form of elongated elements seated within the mentioned channels, each of said elements having opposite end portions extended to project from the mentioned opening and radially beyond the mentioned apertures, one of said end portions of each of said elements lying over one end surface of the mentioned body, the other of said end portions of each of said elements lying over the other end surface of said body, and conductive links for electrically connecting said elements in series, said links being disposed over said end surfaces of said body and joining the end portions of alternate elongated elements.

3. Apparatus as set forth in claim 1, in which the mentioned portions of the mentioned heating means are parts of a continuous spiral-like structure, said parts being disposed within the mentioned opening of the mentioned body and seated within the mentioned channels, and other parts of said structure being wrapped to pass in and out of said opening and over the outer surfaces of said body.

References Cited in the file of this patent

UNITED STATES PATENTS

| | | |
|---|---|---|
| 1,014,875 | Hewitt | Jan. 16, 1912 |
| 2,278,500 | Smith | Apr. 7, 1942 |

FOREIGN PATENTS

| | | |
|---|---|---|
| 937,432 | Germany | Jan. 5, 1956 |
| 246,364 | Italy | Mar. 22, 1926 |